May 1, 1956    C. P. McCLELLAND    2,743,617
WINDSHIELD WIPER CABLE TENSIONING APPARATUS
Filed Jan. 19, 1951    2 Sheets-Sheet 1

Inventor
Clarence P. McClelland
By Willits, Helmig & Baillio
Attorneys

May 1, 1956 C. P. McCLELLAND 2,743,617
WINDSHIELD WIPER CABLE TENSIONING APPARATUS
Filed Jan. 19, 1951 2 Sheets-Sheet 2
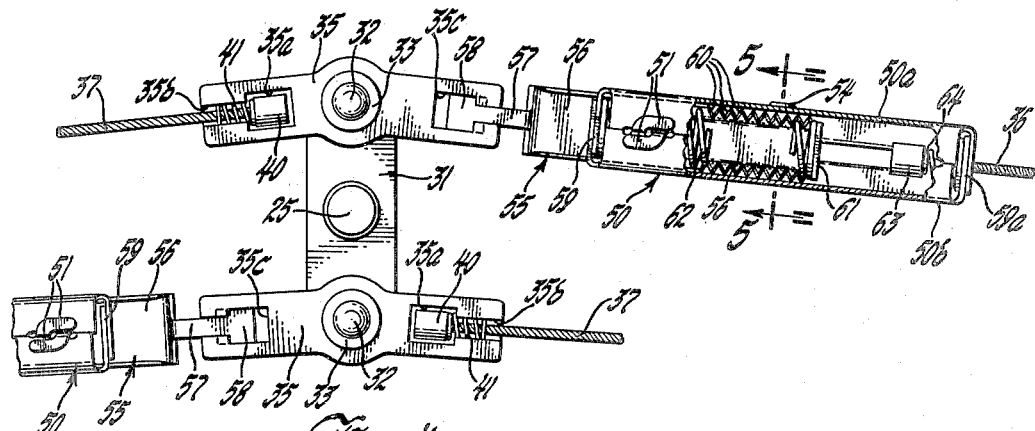
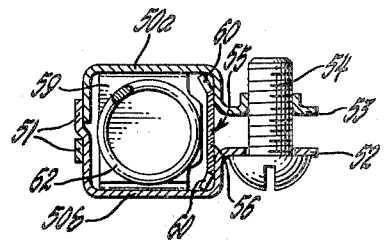
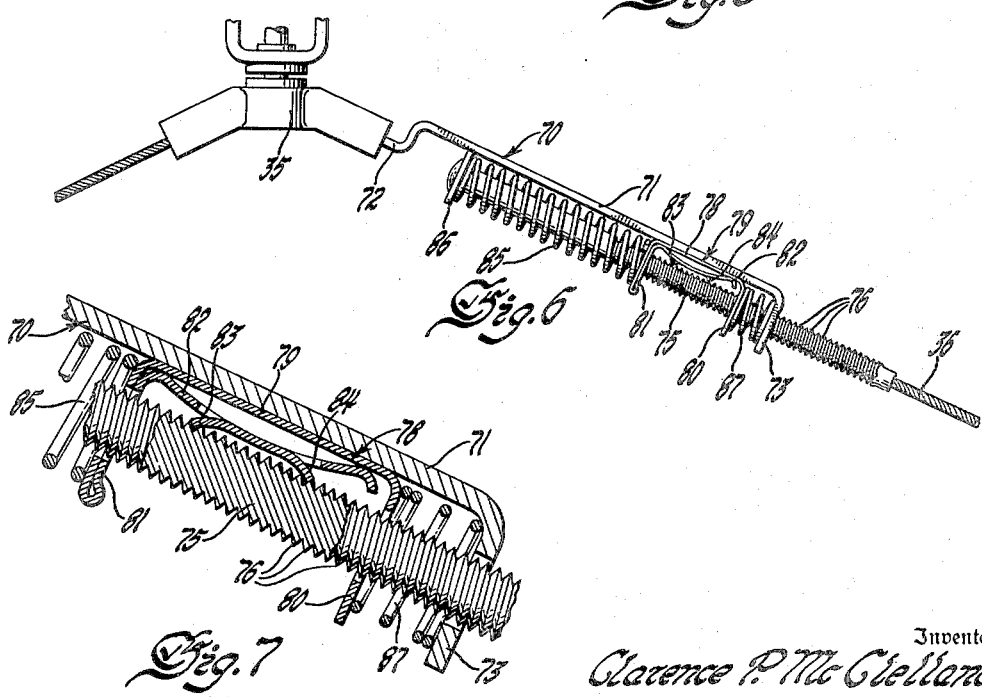
Inventor
Clarence P. McClelland
By Willits, Helwig & Baillio
Attorneys

United States Patent Office 2,743,617
Patented May 1, 1956

2,743,617

WINDSHIELD WIPER CABLE TENSIONING APPARATUS

Clarence P. McClelland, Royal Oak, Mich., assignor to General Motors Corporation, Detroit, Mich., a corporation of Delaware Application January 19, 1951, Serial No. 206,835

12 Claims. (Cl. 74—96)

This invention relates to windshield wiper cable tensioning apparatus, and more particularly to windshield wiper cable tensioning apparatus for removing slack from a cable and applying a fixed tension thereto.

One feature of the invention is that it provides improved windshield wiper cable tensioning apparatus; another feature of the invention is that it provides tensioning means which permits play in the flexible cable during installation of the apparatus, and which acts to tighten the cable after installation is complete; a further feature of the invention is that the tensioning means is normally locked and may readily be released to take up any slack in the cable after a period of operation; still another feature of the invention is that it provides a support member having a compression spring thereon and a slide member mounted on the support member engaging one end of the spring, said members being slidably movable relative to each other to compress and release the spring, and releasable means for locking said members to hold the spring under varying degrees of compression; and yet another feature of the invention is that it provides a second compression spring on the support adapted to exert constant tension on the cable.

Other features and advantages of the invention will be apparent from the following description and from the drawings, in which:

Figure 4 is an enlarged fragmentary elevational view, partly in section, of the tensioning apparatus and a portion of the drive apparatus.

Figure 5 is a transverse section taken along the line 5—5 of Figure 4.

Figure 6 is a fragmentary view similar to a portion of Figure 2, but showing a modified form of tensioning apparatus.

Figure 7 is a fragmentary vertical longitudinal section through a portion of the structure shown in Figure 6.

Figure 1:
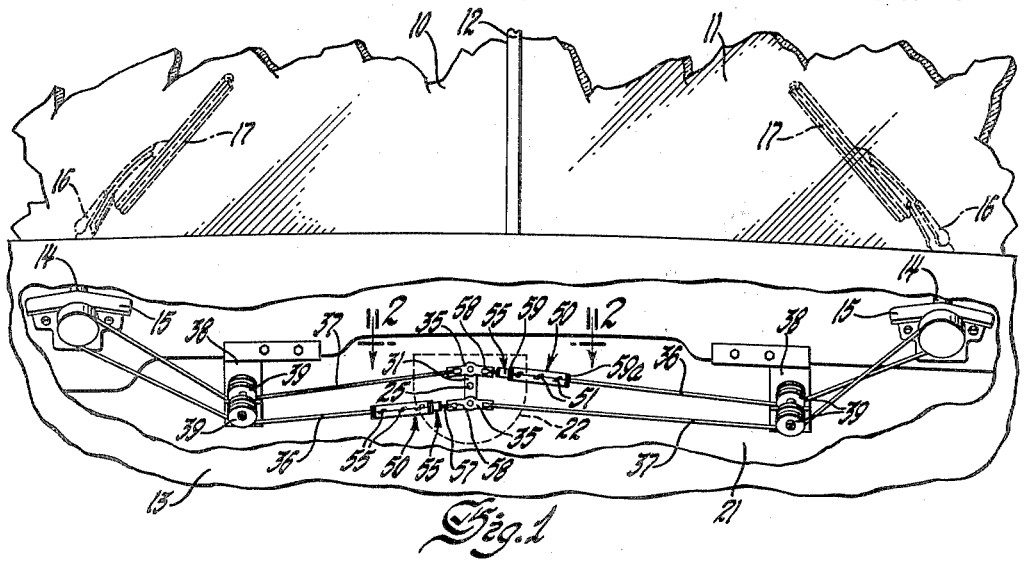
Figure 1 is a fragmentary elevational view of a portion of the dash panel and windshield of an automobile, parts being broken away to show the windshield wiper drive apparatus and the improved tensioning means.

Windshield wipers which are installed in automobiles and other vehicles are operated by a motor which usually is positioned some distance from the wiper blade, particularly when the motor operates a blade on each half of the windshield, and power transmitting means in the form of flexible cables are provided and extend between the motor and the shaft which operates the wiper blade. In order to install the apparatus it is desirable that the cables have some play so that the parts may be properly positioned, particularly when the cables extend over idler pulleys. However, once the apparatus is installed, it is necessary that the cables be taut in order that power from the motor may efficiently be transmitted without lost motion to the wiper operating shaft. It is also desirable that some means be provided for taking up slack which may develop in the cables after a period of use, and it is often desirable to provide a continuous tensioning force on the cables, particularly if the cables do not extend directly from the motor to the wiper operating shaft, but extend over idler pulleys. In this event, movement of the wiper blade while the motor is inoperative, or stopping the wiper blade while the motor is operative, would slacken the cable so that the cable might slip from the idler pulley unless an automatic, continuous tensioning means were provided.

The present invention provides improved cable tensioning apparatus adapted to be mounted in series with the cable to be tensioned and comprising an elongated support member adapted to be connected in series with the cable and having a compression spring extending longitudinally thereof. A slide member is mounted on the support for longitudinal movement therealong, one end of the slide member extending beyond the support member and being secured in series relation with the cable to be tensioned and the other end of the slide member engaging one end of the spring. Said members are slidably movable relative to each other to compress and release the spring, and releasable means are provided for holding the spring under varying degrees of compression. A second compression spring is also provided to exert constant tension on the cable, the first mentioned spring being stronger than the second spring to compress the second spring when the cable is taut.

Referring now more particularly to the drawings, a preferred form of the invention is shown in Figures 1–5, this preferred form being illustrated in a vehicle having a two-part windshield including glass panels 10 and 11 separated by a center partition 12. The windshield is positioned above a dash panel 13, part of which is broken away in Figure 1 in order better to illustrate the windshield wiper drive apparatus. Each panel of the windshield is provided with a separate wiper, and inasmuch as the mechanisms are similar, only the drive and tensioning mechanisms for one of the wipers will be described in detail. Duplicate parts of the mechanisms for the other wiper will be designated by the same reference character as that being used to designate the mechanisms described.

On one side of the windshield a shaft 14 is mounted in a bearing and support plate 15 which is secured, as by bolts, to the vehicle body. The shaft 14 extends outside the body and has an arm 16 mounted on the end thereof, and a windshield wiper blade 17 is mounted on the arm 16 in conventional manner.

A windshield wiper motor 20, which may be of the conventional oscillating type, is mounted near the transverse center of the vehicle on the fire wall 21 by means of a bracket 22 which is bolted to the fire wall. The bracket 22 has a center aperture aligned with the motor shaft 23, and a bearing support 24 is provided to support a stub shaft 25. The motor shaft 23 has at its rear end a block 26 forming one part of a universal connection, the other part comprising a U-shaped member 27 mounted on the forward end of the stub shaft 25 with its arms adjacent opposite sides of the block 26 to provide a simple universal type drive. A spacer washer 29 is mounted on the shaft 25 adjacent its rear end, and at the rear end of the shaft is mounted a motor operating or rocker arm 31 having a pin 32 riveted at each end thereof. A bushing 33 is provided on each of the pins 32, these bushings preferably being formed of porous metal which is impregnated with oil so that the bushing is self lubricating. The bushings provide pivotal mounting means for connecting fingers 35.

Referring again to Figure 1, a pair of cables 36 and 37 extend between the fingers on each side of the motor operating arm 31 and the wiper shaft 14. When two individual wipers are provided as shown in Figure 1, the cables on one side are crossed to provide for asymmetrical operation of the wipers. A bracket 38 is bolted to the fire wall 21 and supports idler pulleys 39 which guide the cables 36 and 37.

Figure 2:
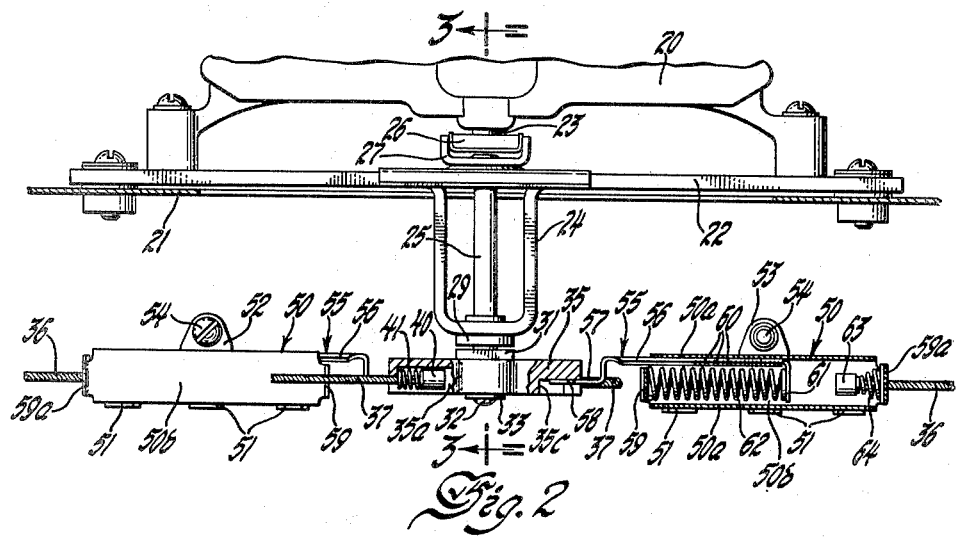
Figure 2 is an enlarged fragmentary section taken along the line 2—2 of Figure 1.
Figure 3:
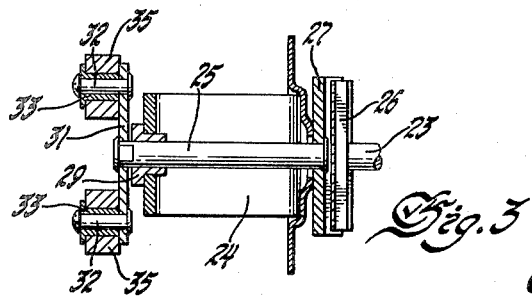
Figure 3 is a section taken along the line 3—3 of Figure 2.

In order to provide an automatic or constant tensioning means to prevent the cables from slipping off the idler pulleys, the cables are not connected directly to the respective fingers 35, but, as shown in Figures 1, 2 and 4, are connected through springs which provide a constant tensioning means. Each of the fingers 35 is provided at one end with an interior chamber 35a which opens into one side of the finger and which opens into the outer end of the finger through a passage 35b. The end of the cable 37 extends through this passage into the interior chamber 35a, and has secured to its end an abutment member 40. A compression spring 41 surrounds the cable and abuts the outer end wall of the chamber 35a at one end and the member 40 at the other end. In Figures 2 and 4 the parts are shown with the spring 41 under only partial compression, as when the spring is taking slack out of the cable. In normal operation the spring 41 would be fully compressed.

The cable 36 is not connected directly to the finger 35, but is connected to said finger through the improved cable tensioning apparatus in series with the cable. An elongated support member designated generally at 50 is formed from two wall portions 50a and 50b, each generally of channel shape and having interlocking ears 51 on their bottom sides. The channel-shaped portion 50b has an up-standing ear 52 with an opening therethrough, and the portion 50a has a complementary ear 53 with a threaded opening therethrough, a stud 54 extending through the opening in the ear 52 and being threaded into the opening in the ear 53 to provide releasable means for compressing the walls 50a and 50b of the support member. The wall portions terminate at each end in transversely extending abutment portions or end walls 59 and 59a.

An elongated slide member designated generally at 55 has a body portion 56 with an offset neck portion 57 at one end terminating in a head portion 58 which is secured in an interior chamber 35c in the finger 35. The body portion 56 of the slide member extends into the interior of the support member 50, being slidable on a trackway formed by upper portions of the members 50a and 50b. The offset portion between the body 56 and the neck 57, in combination with the transversely extending abutment portion 59, forms a stop to limt relative movement between the members 50 and 55. A portion of the side edges of the slide member are provided with serrations 60, as shown best in Figures 2, 4 and 5, and the projecting end of the body portion 56 is provided with a transversely extending abutment portion 61.

A compression spring 62 is carried in the support member 50 and abuts the transversely extending end wall 59 of the support member 50 and the transversely extending portion 61 of the slide member 55.

The cable 36 extends into the interior of the member 50 through an opening in the other end wall 59a thereof, the cable 36 having an abutment member 63 secured to its end. A second compression spring 64 surrounds the cable between the abutment member 63 and the end wall 59a of the support member to exert constant tension on the cable.

In the operation of the apparatus, slide member 55 and support member 50 are pulled apart to elongate the assembly as much as possible and compress the spring 62 while the stud 54 is loose. With the parts in this position the stud is tightened to compress the walls 50b and 50a and clamp the slide member therebetween to lock the members 50 and 55 together, the serrated edges of the slide member providing a high coefficient of friction when the slide member is clamped between the walls of the support member so that the serrations engage said walls. With the parts in this position, the cables 36 and 37 may readily be properly positioned over the idler pulleys 39, and after the installation is complete the stud 54 is loosened and the force of the spring 62 causes the cables to become taut. Preferably the spring 62 is stronger than the spring 64 and exerts several times the force exerted by the spring 64 so that the spring 64 is fully compressed. The stud 54 is again tightened and the installation is complete. In the event the wiper blade is moved when the motor is in operation, or in the event the wiper blade strikes an obstruction and stops when the motor is operating, the spring 64 associated with the cable 36 and the spring 41 associated with the cable 37 operate to hold the cables taut and provide an automatic or constant cable tensioning means. In the event the cables become slack after a period of use, it is only necessary to loosen the stud 54 and the spring 62 will again tighten the cables.

Figures 6 and 7 show a modified form of the invention wherein an elongated support designated generally at 70 has a body portion 71, an offset neck portion 72 and a centrally apertured transverse end wall or abutment portion 73. The neck portion 72 is secured to the finger 35 in the manner described in connection with Figures 1–5. An elongated slide member 75 is mounted on the support 70 for longitudinal movement therealong, the slide member having a serrated portion intermediate its ends, here shown as being formed by screw threads 76. The slide member 75 is positioned with one end extending through the opening in the abutment portion 73, and the end of the cable 36 is attached to this extending end. A spring clip designated generally at 78 has an elongated base portion 79 terminating in end walls 80 and 81. An extension 82 of the end wall 81 is folded over and overlies base portion 79, the extension 82 being dished in its central portion to provide a spring action. Tabs 83 and 84 are punched outwardly from the portion 82 and face in generally opposite directions toward the slide 75.

The end walls 80 and 81 are apertured and the slide member 75 extends through such apertures, the apertures being larger than the diameter of the slide member. The spring portion 82 normally holds the tabs 83 and 84 in engagement with the threads or serrations 76 to lock the spring clip to the slide member. In the event the spring portion 82 is compressed toward the base portion 79 to retract the tabs out of engagement with the serrations, the spring clip is freely slidable on the slide member. A compression spring 85 surrounds a portion of the slide member, one end of said spring abutting the end wall 81 of the spring clip and the other end of the spring engaging a washer 86 mounted on the slide member 75. A second compression spring 87 surrounds another portion of the slide member 75 with one end abutting the end wall 80 of the spring clip and the other end abutting the end wall or abutment portion 73 of the support member 70.

In the operation of the device the spring 85 is fully compressed by pulling the support member and slide member apart as far as possible while the tabs 83 and 84 are held out of engagement with the serrations on the slide member. The spring 85 is preferably stronger than the spring 87 so that the spring 87 also is fully compressed. With the parts in this position, spring portion 82 of the spring clip is released so that the tabs 83 and 84 engage the serrations 76 to lock the spring clip and the slide member together. The windshield wiper drive apparatus is installed, leaving enough slack to install the cables over the idler pulleys 39. After the parts are installed the spring portion 82 of the spring clip is compressed by means of a suitable tool so that the spring 85 takes the slack out of the cable. The spring 87 remains compressed. In the event the cables again become slack for any reason, the spring portion 82 may again be compressed to tighten the cables. In the event the wiper strikes an obstruction while the motor is operating or in the event the wiper blade is moved while the motor is not in operation, the spring 87 will automatically tighten the cable 36, and springs similar to those shown at 41 in Figure 4 will tighten the cable 37.

While I have shown and described certain embodiments of my invention, it is subject to many modifications. Changes, therefore, in the construction and arrangement may be made without departing from the spirit and scope of the invention as set forth in the appended claims.

I claim:

1. Windshield wiper cable tensioning apparatus of the character described, including: an elongated support member having opposite side walls and having a transversely extending abutment portion adjacent one end; a compression spring on said support member extending longitudinally thereof and having one end engaging said abutment portion; an elongated slide member mounted on said support member for longitudinal movement therealong between said walls, one end of said slide member extending beyond said abutment portion and the other end of said slide member engaging the other end of said spring, said members being slidably movable relative to each other to compress and release said spring; and releasable means for compressing said walls to clamp said slide member therebetween to lock said members against relative movement in any position within the range of relative movement and hold said spring under varying degrees of compression.

2. Apparatus of the character claimed in claim 1, wherein at least one edge of said slide member is serrated to provide a high coefficient of friction when said slide member is clamped between said walls.

3. Windshield wiper cable tensioning apparatus of the character described, including: an elongated support member having opposite side walls and having a transversely extending abutment portion at each end; a compression spring on said support member extending longitudinally thereof and having one end engaging one of said abutment portions; an elongated slide member mounted on said support member for longitudinal movement therealong between said walls, one end of said slide member extending beyond said last mentioned abutment portion and the other end of said slide member engaging the other end of said spring, said members being slidably movable relative to each other to compress and release said spring; stop means for limiting the range of relative movement between said members; releasable means for compressing said walls to clamp said slide member therebetween to lock said members in any position within said range and hold said spring under varying degrees of compression; and a second compression spring engaging said other abutment portion and adapted to exert constant tension on said cable.

4. Apparatus of the character claimed in claim 3, wherein the edges of said slide member are serrated to provide a high coefficient of friction when said slide member is clamped between said walls, and wherein said first mentioned compression spring is stronger than said second spring.

5. In windshield wiper drive apparatus having motor means, a power shaft driven thereby, an output shaft for operating the wiper and a pair of flexible cables extending between said shafts, cable tensioning means, including: an elongated support member having opposite side walls and having a transversely extending abutment portion at each end; a compression spring on said support member extending longitudinally thereof and having one end engaging one of said abutment portions; an elongated slide member mounted on said support member for longitudinal movement therealong between said walls, one end of said slide member extending beyond said last mentioned abutment portion and being secured in series with one of said cables, and the other end of said slide member engaging the other end of said spring, said members being slidably movable relative to each other to compress and release said spring; stop means for limiting the range of relative movement between said members; releasable means for compressing said walls to clamp said slide member therebetween to lock said members in any position within said range and hold said spring under varying degrees of compression; and a second compression spring having one end engaging said other abutment portion and the other end secured in series with said cable for exerting constant pressure on said cable, said first mentioned compression spring being stronger than said second spring to compress said second spring when the cable is taut.

6. Windshield wiper cable tensioning apparatus of the character described, including: an elongated support; a resilient clip member on said support; a compression spring on said support having one end engaging said clip member; an elongated slide member mounted on said support for longitudinal movement therealong, said slide member lying adjacent said clip and having one end extending therebeyond and a windshield wiper cable attached thereto and the other end engaging the other end of said compression spring; and complementary means on said slide member and clip for releasably locking said members against relative movement in either direction in one of a plurality of positions to hold said compression spring under varying degrees of compression, the resilient property of said clip urging the clip toward the slide member.

7. Apparatus of the character claimed in claim 6, wherein said complementary means comprises serrations on said slide member and tabs on said resilient clip releasably engaging said serrations.

8. Windshield wiper cable tensioning apparatus of the character described, including: an elongated support member having a transverse abutment portion; an elongated slide member mounted on said support member for longitudinal movement therealong, said slide member having a serrated portion intermediate its ends and being positioned with one end extending through an opening in said abutment portion; a spring clip movably mounted on said support member and said slide member, said clip having spring biased tabs normally releasably engaging said serrated portion; a compression spring surrounding a portion of said slide member with one end abutting an end of said spring clip and the other end engaging the other end of said side member, the engagement of said serrations and tabs holding said compression spring under varying degrees of compression; and a second compression spring surrounding another portion of said slide member with one end abutting the other end of said spring clip and the other end abutting said abutment.

9. Apparatus of the character claimed in claim 8, wherein said first mentioned compression spring is stronger than said second compression spring and said first spring normally compresses said second spring.

10. Windshield wiper cable tensioning apparatus of the character described including: a support member having oppositely facing walls; a spring on said support member; a slide member mounted on said support member between said walls and engaging one end of said spring, said members being slidably movable relative to each other to store energy in or to release energy from said spring; and releasable means for compressing the walls of said support member to lock said members in one of a plurality of positions.

11. In windshield wiper drive apparatus having motor means, a power shaft driven thereby, an output shaft for operating the wiper and a pair of flexible cables extending between said shafts, cable tensioning means, including: an elongated support member having at one end an abutment with guide means integral therewith; a compression spring on said support member extending longitudinally thereof and engaging said abutment; an elongated slide member mounted on said support member for longitudinal movement therealong, one end of said slide member extending through said guide means beyond the support member and the other end engaging said compression spring; said members being slidably movable relative to each other to compress and release said spring; releasable means mounted between the ends of said support member and operatively connected to said members for locking said members in one of a plurality of positions against relative movement in either direction to hold said spring under varying degrees of compression; the free end of one of said members connected to a motor means; the free end of the other of said members attached to a windshield wiper cable; and a second compression spring cooperating with one end of said support member to tension said cable.

12. Windshield wiper cable tensioning apparatus of the character described, including: a support member having an abutment, a compression spring on said support member one end of which spring rests against said abutment; a slide member, means mounting the slide member on said support member, a portion of the slide member engaging one end of said spring, said members being slidably movable relative to each other to compress and release said spring; and releasable means for compressing said support member to engage said slide member and thereby lock said members in one of a plurality of positions to hold said spring under varying degrees of compression.

References Cited in the file of this patent

UNITED STATES PATENTS

| 1,247,760 | Wengraf | Nov. 27, 1917 |
| 1,904,102 | Thompson | Apr. 18, 1933 |
| 2,538,344 | Wahlberg | Jan. 16, 1951 |

FOREIGN PATENTS

| 437,382 | Italy | July 1, 1948 |
| 567,718 | Germany | Jan. 7, 1933 |